(12) United States Patent
Ning et al.

(10) Patent No.: US 12,531,822 B2
(45) Date of Patent: Jan. 20, 2026

(54) METHOD, APPARATUS, TERMINAL DEVICE AND STORAGE MEDIUM FOR INFORMATION PROCESSING

(71) Applicant: Beijing Zitiao Network Technology Co., Ltd., Beijing (CN)

(72) Inventors: Liaoyuan Ning, Beijing (CN); Cong Wang, Beijing (CN); Xinru Zhang, Beijing (CN); Guangyu Zhang, Beijing (CN); Ying Xiao, Beijing (CN); Geliang Tian, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 123 days.

(21) Appl. No.: 18/565,926

(22) PCT Filed: Jul. 22, 2022

(86) PCT No.: PCT/CN2022/107356
§ 371 (c)(1),
(2) Date: Nov. 30, 2023

(87) PCT Pub. No.: WO2023/001280
PCT Pub. Date: Jan. 26, 2023

(65) Prior Publication Data
US 2024/0275745 A1    Aug. 15, 2024

(30) Foreign Application Priority Data
Jul. 23, 2021    (CN) .......................... 202110839645.4

(51) Int. Cl.
*G06F 15/16* (2006.01)
*G06Q 10/10* (2023.01)
(Continued)

(52) U.S. Cl.
CPC ............ *H04L 51/04* (2013.01); *G06Q 10/103* (2013.01); *H04L 12/1813* (2013.01); *H04L 12/185* (2013.01)

(58) Field of Classification Search
CPC ... H04L 51/04; H04L 12/1813; H04L 12/185; H04L 51/046; G06Q 10/103
See application file for complete search history.

(56) References Cited

U.S. PATENT DOCUMENTS

2010/0299664 A1    11/2010    Taylor et al.
2011/0238456 A1    9/2011    Ray et al.
(Continued)

FOREIGN PATENT DOCUMENTS

CN    101800951 A    8/2010
CN    105306600 A    2/2016
(Continued)

OTHER PUBLICATIONS

International Search Report in PCT/CN2022/107356, mailed Oct. 18, 2022, 4 pages.
(Continued)

*Primary Examiner* — John B Walsh
(74) *Attorney, Agent, or Firm* — Astute IP Law Group (57) ABSTRACT

A method, apparatus, terminal device and storage medium for processing information is provided. The method comprises: in response to inputting first information of a target object on a relevant page of the target object, creating a communication group associated with the target object; sending, to the communication group, a first notification message obtained based on the first information. The associated communication group of the target object is created after the first information of the target object is input, a user may create the communication group without creating a page in a group and associate the communication group with
(Continued)

In response to inputting first information of a target object on a relevant page of the target object, create a communication group associated with the target object — S11

Send, to the communication group, a first notification message obtained based on the first information — S12 the target object, so it is unnecessary for the user to perform the steps of creating the communication group and sending the first information only if the target object is input, thereby reducing the user's operations.

19 Claims, 4 Drawing Sheets

(51) Int. Cl.
*H04L 12/18* (2006.01)
*H04L 51/04* (2022.01)

(56) References Cited

U.S. PATENT DOCUMENTS

| | | | |
|---|---|---|---|
| 2012/0197984 | A1 | 8/2012 | Rao |
| 2018/0198831 | A1 | 7/2018 | Calcaterra et al. |
| 2019/0129974 | A1 | 5/2019 | Choi |
| 2020/0412679 | A1 | 12/2020 | Han et al. |
| 2021/0208752 | A1* | 7/2021 | Hwang ................ G06Q 50/01 |
| 2022/0318762 | A1* | 10/2022 | Huang ................ H04L 12/1818 |

FOREIGN PATENT DOCUMENTS

| | | |
|---|---|---|
| CN | 108616445 A | 10/2018 |
| CN | 109522533 A | 3/2019 |
| CN | 110635921 A | 12/2019 |
| CN | 110839104 A | 2/2020 |
| CN | 111147268 A | 5/2020 |
| CN | 111178820 A | 5/2020 |
| CN | 111326245 A | 6/2020 |
| CN | 111565112 A | 8/2020 |
| CN | 111913629 A | 11/2020 |
| CN | 112214971 A | 1/2021 |
| CN | 112632375 A | 4/2021 |
| CN | 112994906 A | 6/2021 |
| CN | 113014472 A | 6/2021 |
| CN | 113098700 A | 7/2021 |
| CN | 113111647 A | 7/2021 |
| CN | 114024927 A | 2/2022 |

OTHER PUBLICATIONS

Office Action in CN202110839645.4, mailed Dec. 22, 2022, 10 pages.
Office Action in CN202110839645.4, mailed Jul. 1, 2023, 11 pages.
First Office Action for Chinese Application No. 202110838724.3, mailed Dec. 26, 2022, 13 Pages.
International Search Report and Written Opinion for International Application No. PCT/CN2022/107355, mailed on Sep. 16, 2022, 17 pages.
Second Office Action for Chinese Application No. 202110838724.3, mailed on Apr. 24, 2023, 13 Pages.
Non-Final Office Action for U.S. Appl. No. 18/565,935, mailed on Mar. 10, 2025, 28 pages.

* cited by examiner

METHOD, APPARATUS, TERMINAL DEVICE AND STORAGE MEDIUM FOR INFORMATION PROCESSING

CROSS-REFERENCE TO RELATED APPLICATION(S)

This application is a national stage application filed under 35 U.S.C. 371 based on International Patent Application No. PCT/CN2022/107356 filed in July. 22, 2022, which claims priority to Chinese Application No. 202110839645.4 filed in July. 23, 2021 and titled "METHOD, APPARATUS, TERMINAL DEVICE AND STORAGE MEDIUM FOR INFORMATION PROCESSING", the disclosures of which are incorporated herein by reference in their entireties.

FIELD

The present disclosure relates to a field of information technology, and more particularly, to a method, apparatus, terminal device and storage medium for information processing.

BACKGROUND

A project information system is used to store a corporation's project information, and a user updates the information stored in the project information system in a manual manner. After the relevant information of a project stored in the project information system is updated, it is necessary to notify relevant members of the project.

SUMMARY

The present disclosure provides a method, apparatus, terminal device and storage medium for information processing.

The present disclosure adopts the following technical solutions.

In some embodiments, the present disclosure provides a method for information processing
 in response to inputting first information of a target object on a relevant page of the target object, creating a communication group associated with the target object;
 sending, to the communication group, a first notification message obtained based on the first information;
 wherein the relevant page of the target object is other page other than a group creating page.

In some embodiments, the present disclosure provides an apparatus for information processing comprising:
 a control unit for in response to inputting first information of a target object on a relevant page of the target object, creating a communication group associated with the target object;
 a sending unit for sending, to the communication group, a first notification message obtained based on the first information; wherein the relevant page of the target object is other page other than a group creating page.

In some embodiments, the present disclosure provides a terminal device comprising: at least one memory and at least one processor;
 wherein the at least one memory is used for storing program code, and the at least one processor is used for calling the program code stored by the at least one memory to execute the method as described above.

In some embodiments, the present disclosure provides a computer-readable storage medium for storing program code that, when executed by a processor, causes the processor to perform the method as described above.

The present disclosure provides a method for information processing: in response to inputting first information of a target object on a relevant page of the target object, creating a communication group associated with the target object; sending, to the communication group, a first notification message obtained based on the first information; wherein the relevant page of the target object is other page other than a group creating page. In some embodiments of the present disclosure, the associated communication group of the target object is created after the first information of the target object is input, a user may create the communication group without creating a page in the group, and associate the communication group with the target object, so it is unnecessary for the user to perform the steps of creating the communication group and sending the first information only if the target object is input, thereby reducing the user's operations.

BRIEF DESCRIPTION OF THE DRAWINGS

The above and other features, advantages, and aspects of embodiments of the present disclosure will become more apparent with reference to the following detailed description when taken in conjunction with the drawings. Throughout the drawings, a same or similar reference numeral indicates a same or similar element. It should be understood that the drawings are illustrative, and that elements and components are not necessarily drawn to scale.

DETAILED DESCRIPTION OF EMBODIMENTS

Hereinafter, embodiments of the present disclosure will be described in more detail with reference to the drawings. While certain embodiments of the present disclosure have been illustrated in the drawings, it is to be understood that the disclosure may be embodied in various forms and should not be limited to the embodiments set forth herein, and rather, these embodiments are provided to give a thorough and complete understanding of the disclosure. It should be understood that the drawings and embodiments of the present disclosure are for illustrative purposes only and are not intended to limit the scope of the present disclosure.

It should be understood that various steps described in implementations of a method of the present disclosure may be performed in order and/or in parallel. Moreover, implementations of the method may include an additional step and/or omit performing the steps shown. The scope of the present disclosure is not limited in this respect.

As used herein, the terms "include", "comprise", and variations thereof are open-ended terms, i.e. "including, but not limited to". The term "based on" is "based, at least in part, on". The term "one embodiment" means "at least one embodiment"; the term "another embodiment" means "at least one further embodiment"; the term "some embodiments" means "at least some embodiments". Relevant definitions of other terms will be given in the following description.

It should be noted that references to "first", "second", and the like in the disclosure are only used to distinguish between different apparatuses, modules, or units and are not intended to limit the order or interdependence of functions performed by these apparatuses, modules, or units.

It should be noted that a modifier of "a" or "an" in the disclosure is intended to be illustrative and not restrictive, and those skilled in the art will understand that it can be explained as "one or more", unless the context clearly indicates otherwise. "A and/or B" in the disclosure is meant to include three cases in parallel: A; B; A and B. That is, it represents at least one of A and B.

The names of messages or information interacted between multiple apparatuses in implementations of the disclosure are for illustrative purposes only, and are not intended to limit the scope of such messages or information.

The solutions provided by this application will be described in detail with reference to the drawings below.

Figure 1:
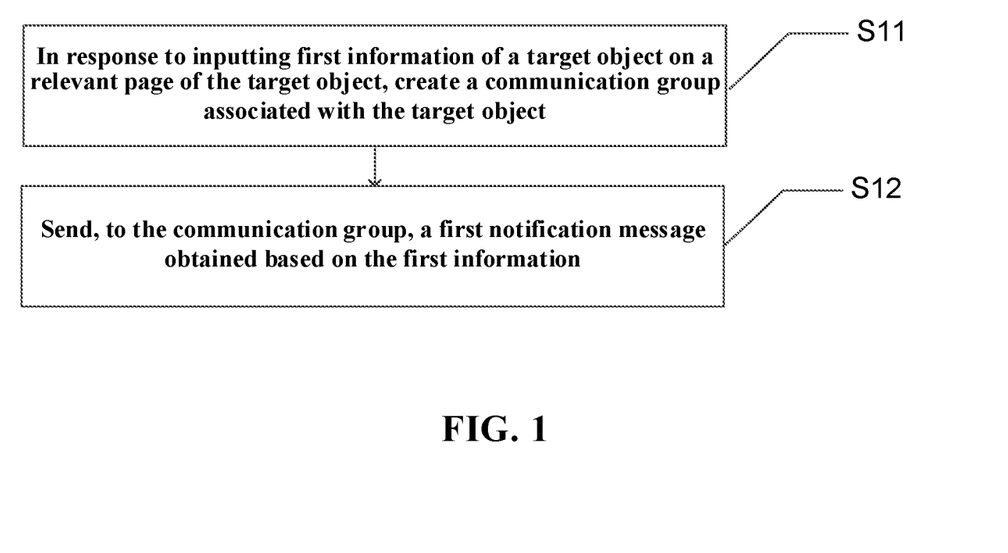
FIG. 1 is a flowchart of a method for information processing according to an embodiment of the present disclosure.

As shown in FIG. 1, FIG. 1 is a flowchart of a method provided by an embodiment of the present disclosure, including the following steps.

A method for information processing is provided in some embodiments of the present disclosure (see FIG. 1), comprising:

S11: in response to inputting first information of a target object on a relevant page of the target object, creating a communication group associated with the target object.

S12: sending, to the communication group, a first notification message obtained based on the first information.

In some embodiments, the target object is an object, which can be, for example, certain project information, and the relevant page of the target object is other page other than a group creating page, i.e. the relevant page is not a page for a communication client to create the communication group in the related art. The relevant page of the target object may be an information input page of the project information, which may be used to input association information for the target object. The relevant page may be a page in a data system storing the information of the target object, or may be a page of the target object opened on an applet, the first information may be, for example, information such as update information or follow-up information of a project, and after the first information is input, a communication group associated with the target object is created, and then a first notification message is sent to the first information. In some embodiments, the first notification message may include the first information.

In some embodiments of the present disclosure, the associated communication group of the target object is created after the first information of the target object is input, and the user may create the communication group without creating a page in a group and associate the communication group with the target object, so it is unnecessary for the user to perform the steps of creating the communication group and sending the first information only if the target object is input, thereby reducing the user's operations, and with the association of the target object with the communication group, the association information for the target object may be received via the communication group associated with the target object, and thereafter, when the association information for the target object is updated, an update message may be automatically sent to an associated group of the target object so that users in the communication group can learn about the update in real time.

In some embodiments of the present disclosure, the communication group is a communication group on a communication client; the relevant page of the target object is other page other than the communication client. In some embodiments, the communication client may, for example, be an instant communication client, the instant communication client being used for instant communication, and the communication group associated with the target object is a communication group on the communication client, which may display an identification of the communication group associated with the target object in a group list of the communication client, and the communication group associated with the target object may be entered by triggering the identification. In some embodiments of the present disclosure, the associated page for the target object is not on the communication client, but a communication group associated with the target object may be created on the communication client.

In some embodiments of the present disclosure, in response to inputting first information of a target object on a relevant page of the target object, creating a communication group associated with the target object includes: in response to a target area of an associated page for a target object being selected, displaying a group creating option; in response to the group creating option being selected and the first information being inputted in the target area, creating the communication group associated with the target object.

In some embodiments, the target area may be an input area in an associated page for the target object, and may be selected by a mouse or the like controlling the identification. After the target area is selected, a group creating option is exhibited, and may be, for example, a selection box displayed around the target area, and after the selection is prompted around the selection box, an associated communication group will be created, and by selecting the selection box, the associated communication group of the target object may be created after the first information is input in the target area.

In some embodiments of the present disclosure, after the step of creating a communication group associated with the target object, the method further comprises: associating the communication group associated with the target object with a first information type of the first information; the communication group is used for receiving a message including information of the first information type of the target object.

In some embodiments, the communication group associated with the target object is associated with the first information type, which indicates that when a user sends the information of the first information type of the target object, the information of the first information type will be sent into the communication group associated with the target object, rather than sending all the association information for the target object into the communication group associated with the target object, so the information can be filtered to facilitate the user to view the information of the information type concerned by the user without being disturbed by other information.

In some embodiments of the present disclosure, prior to the step of creating a communication group associated with the target object, the method further comprises: determining whether a communication group creating condition of the target object is satisfied; in response to determining that the communication group creating condition is satisfied, performing the step of creating a communication group associated with the target object.

In some embodiments, a condition verification may be performed before the communication group associated with the target object is created, and the communication group is created only when the communication group creating condition is satisfied, because some target objects may already have an associated communication group, and certain target object is under the consideration of privacy, which causes the creation of the communication group not to be allowed, and by setting the communication group creating condition, the problems of privacy or repeatedly creation of the communication group can be avoided.

In some embodiments of the present disclosure, the communication group creating condition of the target object includes: a communication group associated with the target object is absent; or, a communication group associated with the target object is absent, and an instruction to create a group is received.

In some embodiments, a communication group for a target object may be created in the absence of an associated communication group for the target object. In other cases, while no an associated communication group is present for the target object, an instruction to create a group is required to be received, and the instruction to create a group may be generated by a user triggering a specific option, or may be generated after verifying an authority of a user, determining that the user has the authority to create a group and receiving a user triggering operation, on which there is no limitation. By defining that a communication group is created in the absence of a communication group associated with a target object, waste of resources and dispersion of association information for the target object caused by repeatedly creating the communication group associated with the target object can be avoided, and by defining that a communication group is created only if an instruction to create a group is received, the problem of poor user experience caused by creating a communication group when the creation of the communication group is not desired by the user can be prevented.

In some embodiments of the present disclosure, a communication group associated with the target object is absent, a group creating identification is displayed, and the instruction to create a group is received after the group creating identification is triggered. In some embodiments, if the communication group associated with the target object is present, the group creating identification may not be displayed, and the group creating identification may be displayed only in the absence of the communication group associated with the target object, so it is possible to know whether the communication group for the target object already exists by checking whether the group creating identification is displayed, avoiding duplicate creation, and avoiding the problem that a communication group is created when the creation of the communication group is not desired by the user since the communication group is created after the group creating identification is triggered.

In some embodiments of the present disclosure, the relevant page of the target object includes: a page of the target object displayed in an applet. In some embodiments, the first information is input in the applet by displaying the page of the target object in the applet, thereby facilitating the user to input the first information at any time and improving the ease of entry. In some embodiments of the present disclosure, the relevant page of the target object includes: a page of the target object in a data system, the data system including more than one page of the target object. In some embodiments, the data system is a storage system in a server, which can store the relevant page of the target object. For example, the target object is a project, and the data system may be a project system on the server. Information of the target object in the data system may be updated by directly inputting the first information in the data system, and a communication group is created at the same time as the update so as to push the update to the communication group, realizing real-time reminding.

In some embodiments of the present disclosure, the creating a communication group associated with the target object includes: sending a group creating instruction to a chatbot, performing, by the chatbot, the steps of the creating a communication group associated with the target object, and sending, to the communication group, a first notification message obtained based on the first information. In some embodiments of the present disclosure, the chatbot may be a chatbot in an instant communication software, which may be a public account set in advance, and a first notification message is created and sent by the chatbot, so the user that creates the first information may not join the communication group, but the user that creates the first information may also be added into the communication group when the communication is created. In summary, some embodiments may also avoid privilege issues by employing a chatbot to create and send the first notification message, and since the chatbot would not reveal information of the communication group, it will not be limited by group privileges.

In some embodiments of the present disclosure, if a communication group associated with the target object is present, the method further comprises: sending, to the communication group associated with the target object, a first notification message obtained based on the first information. In some embodiments, in the case where a communication group associated with the target object already exists, the first notification message may be sent to the already existing communication group without repeating the creation of the communication group.

In some embodiments of the present disclosure, if a communication group associated with the target object is present, the method further comprises: determining whether a current user that inputs the first information has joined the communication group associated with the target object; if not, adding the current user into the communication group associated with the target object. In some embodiments, the first information is information of the target object, and therefore a current user that creates the first information is necessarily related to the target object, and thus, in the case where a communication group for the target object already exists, the current user will be tried to join the communication group, and the communication group may be interested in the first notification message after the first notification message is received, and a member in the communication group may contact the current user, so adding the current user into the communication group can facilitate the member in the communication group to contact the current user.

In some embodiments of the present disclosure, the adding the current user into the communication group associated with the target object includes:
  if the communication group associated with the target object is a communication group created by a chatbot, adding the current user into the communication group associated with the target object; alternatively, the chatbot may be a preset artificial intelligence program, and the communication group created by the chatbot is not a communication group created by a user, and at this time, the communication group may have no responsible group owner, and thus the current user may be directly added into the communication group.

In some embodiments of the present disclosure, if the communication group associated with the target object is a communication group created by a user and the communication group is set to an open state, the current user is added into the communication group associated with the target object; alternatively, the communication group created by the user may be a communication group created by a natural human user, and the open state may be a joinable state, for example, a joinable state without authentication, and at this time, although the communication group created by the user is not a communication group created by a chatbot, the current user may directly join the communication group associated with the target object without authentication.

In some embodiments of the present disclosure, if the communication group associated with the target object is a communication group created by a user and the communication group is set to a closed state, reminder information is displayed, the reminder information being used for prompting a failure of adding the current user into the communication group. In some embodiments, when the communication group cannot be directly joined in a closed state, the reminder information is sent at this time to remind at least one of the following information: a failure of joining the communication group, group owner information and an entering-group authentication entry, contact information of a group owner of the communication group may also be displayed in the reminder information, thereby enabling the current user to contact the group owner so as to join the communication group, and the reminder information may also display an entering-group authentication entry, which is an entry for applying for joining the group, and an application may be submitted in the entering-group authentication entry so as to send application information to the group owner for applying for joining the communication group.

In some embodiments of the present disclosure, if a communication group associated with the target object is present, the method further comprises: based on an affiliation relationship of the current user with the communication group and characteristic information of the communication group, one of an entering-group identification or a joining-group identification is displayed, the entering-group identification being used for entering the communication group, and the joining-group identification being used for joining the communication group.

In some embodiments, if a communication group associated with the target object already is present, there may be a need to further determine an attribution relationship between the current user and the communication group and characteristic information of the communication group; based on the attribution relationship and the characteristic information, one of an entering-group identification or a joining-group identification is displayed; after the entering-group identification is triggered, the current user may attempt to enter the communication group; and after the joining-group identification is triggered, the current user may attempt to join the communication group. The joining-group identification and the entering-group identification may be a reminder icon, which is triggered by clicking on it.

In some embodiments of the present disclosure, based on an affiliation relationship of the current user with the communication group and characteristic information of the communication group, displaying one of an entering-group identification or a joining-group identification includes: if the current user has joined the communication group associated with the target object, displaying the entering-group identification, and entering the communication group after the entering-group identification is triggered. In some embodiments, after the current user has joined the communication group associated with the target object, the second identification may be triggered by clicking or the like, and then the jumping towards the communication group is performed and the group chat interface is displayed.

In some embodiments of the present disclosure, based on an affiliation relationship of the current user with the communication group and characteristic information of the communication group, displaying one of an entering-group identification or a joining-group identification includes: if the current user does not join the communication group associated with the target object, and the communication group associated with the target object is a communication group created by a chatbot, displaying the joining-group identification, and joining and entering the communication group after the joining-group identification is triggered. In some embodiments, the communication group created by the chatbot may have no group owner or may be set to freely join by default. In the case where the current user does not join the communication group associated with the target object, if the communication group is the communication group created by the chatbot, the communication group may be automatically joined and entered with the joining-group identification being triggered. In some embodiments, joining the communication group means becoming a member of the communication group, and entering the communication group means opening a group chat interface of the communication group.

In some embodiments of the present disclosure, based on an affiliation relationship of the current user with the communication group and characteristic information of the communication group, displaying one of an entering-group identification or a joining-group identification includes: if the current user does not join the communication group associated with the target object, the communication group associated with the target object is a communication group created by a user, and the communication group is set as an open state, displaying the joining-group identification, and joining and entering the communication group after the joining-group identification is triggered. In some embodiments, the communication group created by the user refers to a communication group created by a user of a natural human, and the open state may be a state that it can be joined without authentication, and at this time, the joining-group identification is displayed, the communication group is joined after the joining-group identification is triggered, and the communication group may be simultaneously entered.

In some embodiments of the present disclosure, based on an affiliation relationship of the current user with the communication group and characteristic information of the communication group, displaying one of an entering-group identification or a joining-group identification includes: if the current user does not join the communication group associated with the target object, the communication group associated with the target object is a communication group created by a user, and the communication group is set to a closed state, displaying the joining-group identification, and after the joining-group identification is triggered, prompting at least one of the following information: a failure of joining the communication group, group owner information, and an entering-group authentication entry. In some embodiments, the communication group created by the user refers to a communication group created by a user of a natural human, and a closed state may be a non-joinable state or a joinable state with authentication, for example, an input of authentication information, and at this time, after the joining-group identification is triggered, a failure of joining the communication group is prompted, and a group owner's contact information and the entering-group authentication entry may be displayed, and the entering-group authentication entry may be used for submitting a joining application so as to facilitate the user to apply for joining the communication group.

In some embodiments of the present disclosure, the method further comprises: in response to the communication group associated with the target object being created, adding a target user that satisfies a preset rule into the communication group. In some embodiments, a preset rule is set in advance, and is used for determining a user that is automatically pulled into the communication group after the communication group is created. For example, the target object may be an internal project, and the preset rule may be for adding a user with a preset function into the communication group. In some embodiments, in response to the communication group associated with the target object being created, a chatbot is added into the communication group, the chatbot being a non-natural human account through which the addition of the chatbot into the communication group may send system information.

In some embodiments of the present disclosure, adding a target user that satisfies a preset rule into the communication group includes: determining the target user according to the target object and/or a type of the first information; adding the target user into the communication group. In some embodiments, the communication group is a communication group for the target object, and thus, a user associated with the target object may be added into the communication group. In some embodiments, there may be more users associated with the target object, but not all the associated users are related to the first information. For example, the first information is a certain type of report in a project, and at this time, only the user associated with the certain type of report is interested in the first information, and thus, the target user may also be determined according to the type of the first information. Of course, it is also possible to determine the target user in combination with both the target object and the type of the first information.

In some embodiments of the present disclosure, determining the target user according to the target object and/or a type of the first information includes: determining selectable users associated with the target object; determining the target user associated with the type of the first information from the selectable users. In some embodiments, first, the selectable users associated with the target object are determined according to the target object, and then the target user associated with the type of the first information is determined from the selectable users, so the most relevant user is automatically added into the communication group after the communication group is created without requiring a manual search by the user. In some embodiments, the step of determining the target user may be performed for automatically recognizing the target object and the type of the first information, or the step of determining the target user may be performed in connection with the user's operation. For example, a button for automatically adding a member may be displayed, and the target object may be automatically added after the user clicks.

In some embodiments of the present disclosure, the type of the first information is used to characterize a use or function of the first information. In the embodiment, the type of the first information is not intended to mean that the first information is a data format type of text or image, but mean a use type or a function type of the first information. For example, if the first information is used for identifying a requirement of a project, then the type thereof is a requirement type, and if the first information is used for identifying a log of a project, then the type of the first information is a log type. Based on the user or function of the first information, it is possible to determine the users that may be related to it, and thus it is possible to determine the target user according to the type of the first information in order to achieve an automatic search of the specific associated person.

In some embodiments of the present disclosure, the method further comprises: in response to the communication group associated with the target object being created, sending, to the communication group associated with the target object, a second notification message, the second notification message being used to inform that the target object is associated with the communication group. In some embodiments, the second notification message is sent after the communication group is created so as to notify users joining the communication group.

In some embodiments of the present disclosure, an address of an information page of the target object in a data system is included in the second notification message; the second notification message opens the information page of the target object in the data system after being triggered. In some embodiments, the second notification message is triggered by clicking or the like to open the information page of the target object, thereby facilitating the user in the communication group to learn about the associated target object.

In some embodiments of the present disclosure, if a current user that inputs the first information is a member of the communication group associated with the target object, the first notification message is sent via an account of the current user. In some embodiments, in the case where the current user has joined the communication group, the first message is sent directly via the account of the current user so that members of the group know the sender of the message and know that the sender of the message is in the group without going to other groups to find the sender of the message.

In some embodiments, a group member of the communication group associated with the target object includes a chatbot, and if the current user is not a member of the target communication group, the first notification message is sent via an account of the chatbot and a user identification of the current user is displayed. In some embodiments, the first message is sent by the chatbot in a first target group, which may avoid a possible problem that the current user does not have access rights to the first target group.

In some embodiments of the present disclosure, the first notification message includes an address of an information page of the target object; the first notification message, after being triggered, opens the information page of the target object in a data system. In some embodiments, a member in the communication group may trigger the first notification message by clicking the first notification message; after the first notification message is triggered, the information page of the target object in the data system is opened, and the information page of the target object may be used for displaying association information for the target object, and locating a position where an update corresponding to the first notification message is located; the update corresponding to the first notification message may refer to an update performed according to the first information; for example, if information A is added by the first information in the association information for the target object, then the added information A is the update corresponding to the first notification message; after the first notification message is triggered, the information page of the target object may be opened and located to the position of information A. By locating to the position of the update corresponding to the first notification message, it is convenient for the user to view other messages related to the update message and to trace to all information records of the target object. In some embodiments, the first notification message is displayed in the form of a message card, the message card has a link therein, and an associated information page of the target object in the data system is opened by clicking the link in the message card and is located to the position where the update corresponding to the first notification message is located. In other embodiments, triggering may be performed by double-clicking, presetting a gesture operation, or the like on the first notification message, and alternatively, the first notification message may be triggered by clicking a control corresponding to the first notification message. For example, by right-clicking the first notification message and displaying the control, the first notification message may be triggered after the control is clicked.

In some embodiments of the present disclosure, there is also provided an apparatus for information processing comprising:

a control unit for in response to inputting first information of a target object on a relevant page of the target object, creating a communication group associated with the target object;

a sending unit for sending, to the communication group, a first notification message obtained based on the first information; wherein the relevant page of the target object is other page other than a group creating page.

According to one or more embodiments of the present disclosure, the control unit is further configured to associate the communication group associated with the target object with a first information type of the first information; the communication group is used for receiving a message including information of the first information type of the target object.

According to one or more embodiments of the present disclosure, the control unit is further configured to determine whether a communication group creating condition of the target object is satisfied;

in response to determining that the communication group creating condition is satisfied, performing the step of creating a communication group associated with the target object.

According to one or more embodiments of the present disclosure, the communication group creating condition of the target object includes: a communication group associated with the target object is absent; or  a communication group associated with the target object is absent, and an instruction to create a group is received.

According to one or more embodiments of the present disclosure, the control unit is further configured to in the case where a communication group associated with the target object is absent, display a group creating identification, and receive the instruction to create the group after the group creating identification is triggered.

According to one or more embodiments of the present disclosure, the relevant page of the target object includes:

a page of the target object displayed in an applet; or a page of the target object in a data system, the data system including more than one page of the target object.

According to one or more embodiments of the present disclosure, the control unit creating a communication group associated with the target object includes: sending a group creating instruction to a chatbot, performing, by the chatbot, the steps of the creating a communication group associated with the target object, and sending, to the communication group, a first notification message obtained based on the first information.

According to one or more embodiments of the present disclosure, the sending unit is further configured to if a communication group associated with the target object is present, send, to the communication group associated with the target object, a first notification message obtained based on the first information.

According to one or more embodiments of the present disclosure, the control unit is further configured to if a communication group associated with the target object is present, determine whether a current user that inputs the first information has joined the communication group associated with the target object;

if not, add the current user into the communication group associated with the target object.

According to one or more embodiments of the present disclosure, the control unit adding the current user into the communication group associated with the target object includes:

if the communication group associated with the target object is a communication group created by a chatbot, adding the current user into the communication group associated with the target object;

or, if the communication group associated with the target object is a communication group created by a user and the communication group is set to an open state, adding the current user into the communication group associated with the target object;

or, if the communication group associated with the target object is a communication group created by a user and the communication group is set to a closed state, displaying reminder information, and the reminder information being used for prompting a failure of adding the current user into the communication group.

According to one or more embodiments of the present disclosure, the control unit is further configured to based on an affiliation relationship of the current user with the communication group and characteristic information of the communication group, display one of an entering-group identification or a joining-group identification, the entering-group identification being used for entering the communication group, and the joining-group identification being used for joining the communication group.

According to one or more embodiments of the present disclosure, the control unit displaying one of an entering-group identification or a joining-group identification based on an affiliation relationship of the current user with the communication group and characteristic information of the communication group includes:

if the current user has joined the communication group associated with the target object, displaying the entering-group identification, and entering the communication group after the entering-group identification is triggered; or  if the current user does not join the communication group associated with the target object, and the communication group associated with the target object is a communication group created by a chatbot, displaying the joining-group identification, and joining and entering the communication group after the joining-group identification is triggered; or  if the current user does not join the communication group associated with the target object, the communication group associated with the target object is a communication group created by a user, and the communication group is set as an open state, displaying the joining-group identification, and joining and entering the communication group after the joining-group identification is triggered; or if the current user does not join the communication group associated with the target object, the communication group associated with the target object is a communication group created by a user, and the communication group is set to a closed state, displaying the joining-group identification, and after the joining-group identification is triggered, prompting at least one of the following information: a failure of joining the communication group, group owner information, and an entering-group authentication entry.

According to one or more embodiments of the present disclosure, the control unit is further configured to: in response to the communication group associated with the target object being created, add a target user that satisfies a preset rule into the communication group.

According to one or more embodiments of the present disclosure, the control unit adding a target user that satisfies a preset rule into the communication group includes:

determining the target user according to the target object and/or a type of the first information;

adding the target user into the communication group.

According to one or more embodiments of the present disclosure, the control unit determining the target user according to the target object and/or a type of the first information includes:

determining selectable users associated with the target object;

determining the target user associated with the type of the first information from the selectable users.

According to one or more embodiments of the present disclosure, the type of the first information is used to characterize a use or function of the first information.

According to one or more embodiments of the present disclosure, the sending unit is further configured to in response to the communication group associated with the target object being created, send, to the communication group associated with the target object, a second notification message, the second notification message being used to inform that the target object is associated with the communication group.

According to one or more embodiments of the present disclosure, an address of an information page of the target object in a data system is included in the second notification message; the second notification message opens the information page of the target object in the data system after being triggered.

According to one or more embodiments of the present disclosure, the control unit is configured to, if a current user that inputs the first information is a member of the communication group associated with the target object, send the first notification message via an account of the current user; or a group member of the communication group associated with the target object includes a chatbot, and if the current user is not a member of the target communication group, the first notification message is sent via an account of the chatbot and a user identification of the current user is displayed.

According to one or more embodiments of the present disclosure, the first notification message includes an address of an information page of the target object; the first notification message, after being triggered, opens the information page of the target object in a data system.

As regards the embodiments of the apparatus, which substantially correspond to the embodiments of the method, reference is made to the section of the description of the embodiments of the method. The embodiments of apparatus described above are merely illustrative, wherein modules illustrated as separate modules may or may not be separate. Some or all of the modules may be selected according to actual needs to achieve the purpose(s) of solutions of the embodiments. One of ordinary skill in the art would be able to understand and implement without any inventive effort.

The method and apparatus of the present disclosure have been described above based on embodiments and application examples. In addition, the present disclosure provides a terminal device and a storage medium, which are described below.

Figure 2:
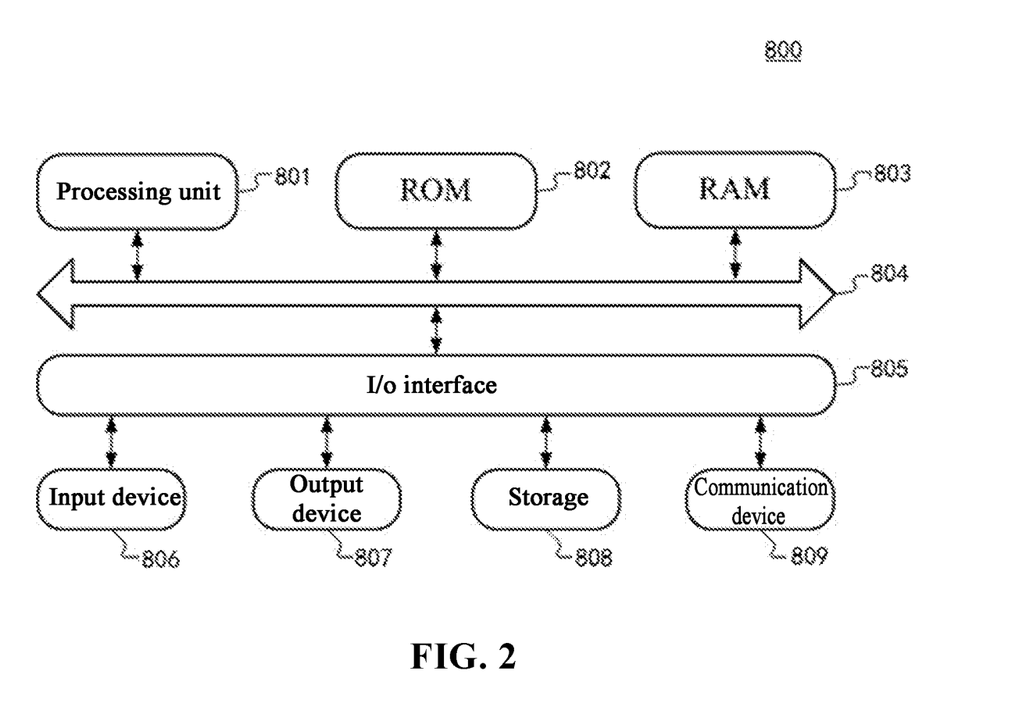
FIG. 2 is a schematic structural diagram of an electronic device according to an embodiment of the present disclosure.
Figure 3:
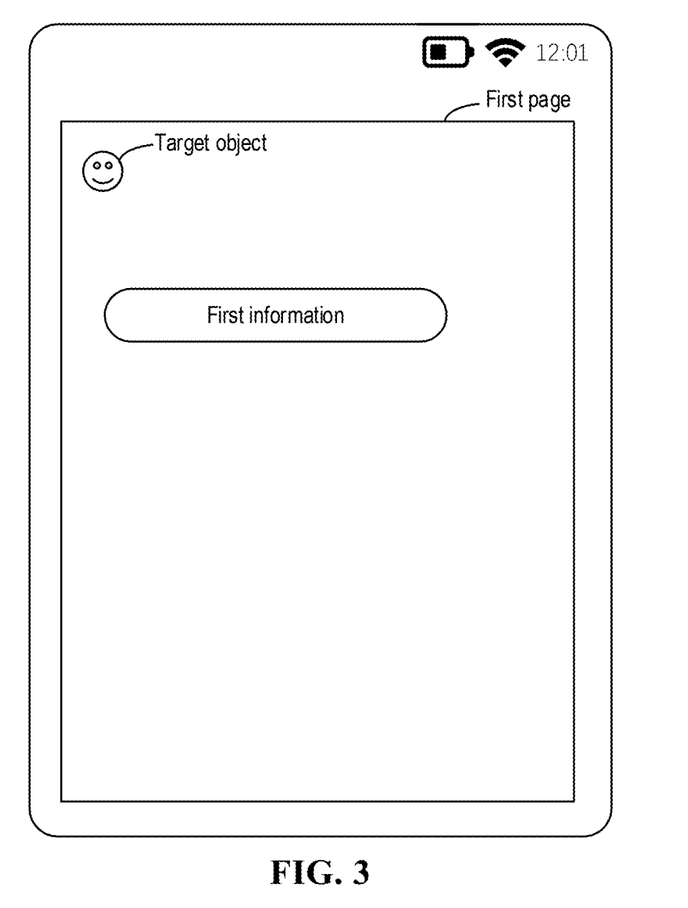
Figure 4:
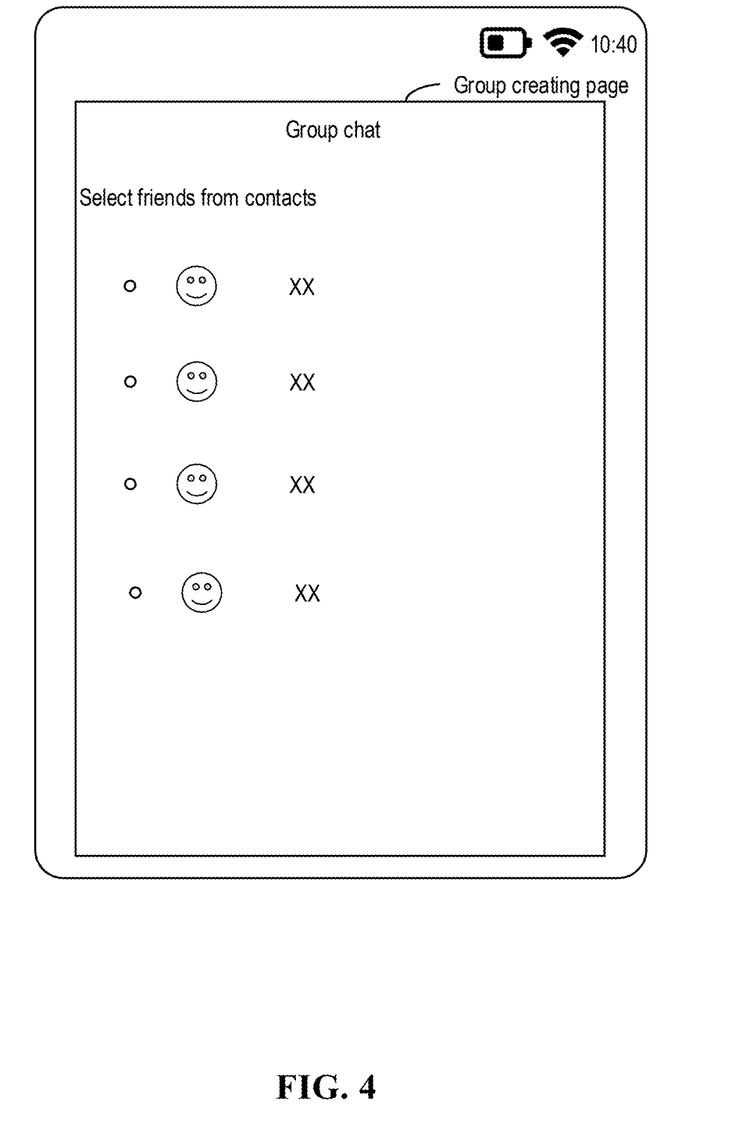

Referring now to FIG. 2, a block diagram of an electronic device (which may be, for example, a terminal device or a server, which may also be referred to as a terminal) 800 suitable for implementing embodiments of the present disclosure is shown. The terminal device in the embodiments of the present disclosure may include, but is not limited to, a mobile terminal such as a mobile phone, a notebook computer, a digital broadcast receiver, a PDA (Personal Digital Assistant), a PAD (Tablet Computer), a PMP (Portable Multimedia Player), an in-vehicle terminal (e.g. an in-vehicle navigation terminal), etc. and a fixed terminal such as a digital TV, a desktop computer, etc. The electronic device shown in the drawings is merely an example and should not cause any limitation on the scope of use or functionality of the embodiments of the present disclosure.

As shown in FIG. 2, the electronic device 800 may include a processing unit (e.g. a central processor, a graphics processor, etc.) 801 that may perform various suitable actions and processes in accordance with programs stored in the read only memory (ROM) 802 or loaded from the storage 808 into the random access memory (RAM) 803. In the RAM 803, various programs and data required for the operation(s) of the electronic device 800 are also stored. The processing unit 801, the ROM 802 and the RAM 803 are connected to each other via the bus 804. The input/output (I/O) interface 805 is also coupled to the bus 804.

Generally, the following devices may be connected to the I/O interface 805: the input device 806 including, for example, a touch screen, a touch pad, a keyboard, a mouse, a camera, a microphone, an accelerometer, a gyroscope, etc.; the output device 807 including, for example, a liquid crystal display (LCD), a speaker, a vibrator, etc.; the storage 808 including, for example, a magnetic tape, a hard disk, etc.; and communication device 809. The communication device 809 may allow the electronic device 800 to communicate wirelessly or wired with other devices to exchange data. Although the electronic device 800 is shown with various devices, it should be understood that not all of the devices shown are required to be implemented or provided. More or fewer devices may alternatively be implemented or provided.

In particular, the processes described above with reference to the flowchart may be implemented as computer software programs in accordance with embodiments of the present disclosure. For example, the embodiments of the present disclosure include a computer program product comprising a computer program embodied on a computer-readable medium, the computer program containing program code for performing the method illustrated by the flowchart. In such embodiments, the computer program may be downloaded and installed from a network via the communication device 809, or may be installed from the storage

808, or may be installed from the ROM 802. When the computer program is executed by the processing unit 801, the above-described functions defined in the method of the embodiment of the present disclosure are performed.

Note that the computer-readable medium described above in the disclosure can be either a computer-readable signal medium or a computer-readable storage medium, or any combination thereof. The computer-readable storage medium can be, for example but not limited to, an electronic, magnetic, optical, electromagnetic, infrared, or semiconductor system, apparatus, or device, or any combination of thereof. More specific examples of the computer-readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the disclosure, the computer-readable storage medium can be any tangible medium that contains or stores a program that can be used by or in connection with an instruction execution system, apparatus, or device. In the disclosure, the computer-readable signal medium may include a data signal propagated in baseband or as part of a carrier wave, on which computer-readable program code is embodied. Such propagated data signal may take many forms, including but not limited to, electromagnetic signals, optical signals, or any suitable combination thereof. The computer-readable signal medium may also be any computer-readable medium other than the computer-readable storage medium that can send, propagate, or transfer the program for use by or in connection with the instruction execution system, apparatus, or device. The program code embodied on the computer-readable medium may be transmitted over any suitable medium including, but not limited to: wire, optic cable, RF (radio frequency), and the like, or any suitable combination thereof.

In some implementations, clients, servers may communicate using any currently known or future developed network protocol, such as HTTP (Hyper Text Transfer Protocol), and may be interconnected with any form or medium of digital data communication (e.g. a communication network). Examples of the communication network include a local area network ("LAN"), a wide area network ("WAN"), an internetwork (e.g. the Internet), a peer-to-peer network (e.g. an ad hoc peer-to-peer network), and any currently known or future developed network.

The computer readable medium may be contained in the electronic device; it may also be present separately and not fitted into the electronic device.

The computer readable medium carries one or more programs that, when executed by the electronic device, cause the electronic device to perform the method of the present disclosure as described above.

Computer program code for carrying out operations of the present disclosure may be written in one or more programming languages including an object oriented programming language such as Java, Smalltalk, C++, and conventional procedural programming languages, such as the "C" language or similar programming languages, or a combination thereof. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g. through the Internet using an Internet Service Provider).

The flowchart and block diagram in the Figures illustrate the architecture, functionality, and operation of possible implementations of systems, methods and computer program products according to various embodiments of the present disclosure. In this regard, each block in the flowchart or block diagram may represent a module, segment, or portion of code, which includes one or more executable instructions for implementing the specified logical function(s). It should also be noted that in some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagram and/or flowchart, and combinations of blocks in the block diagram and/or flowchart, can be implemented by special purpose hardware-based systems which perform the specified functions or operations, or combinations of special purpose hardware and computer instructions.

The units involved in the description of the embodiments of the disclosure may be implemented in software or hardware. The name of a unit does not in any way limit the unit itself.

The functions described herein above may be performed, at least in part, by one or more hardware logic component(s). For example, without limitation, an exemplary type of hardware logic component that may be used includes: a field programmable gate array (FPGA), an application specific integrated circuit (ASIC), an application specific standard product (ASSPs), a system on a chip (SOC), a complex programmable logic device (CPLD), and the like.

In the context of this disclosure, the machine-readable medium can be a tangible medium that can contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium would include an electrical connection based on one or more wire(s), a portable computer diskette, a hard disk, a random access memory (RAM), a read-only memory (ROM), an erasable programmable read-only memory (EPROM or flash memory), an optical fiber, a compact disc read-only memory (CD-ROM), an optical storage device, a magnetic storage device, or any suitable combination thereof.

According to one or more embodiments of the present disclosure, [Example 1] provides a method for information processing comprising:

in response to inputting first information of a target object on a relevant page of the target object, creating a communication group associated with the target object;

sending, to the communication group, a first notification message obtained based on the first information;

wherein the relevant page of the target object is other page other than a group creating page.

According to one or more embodiments of the present disclosure, [Example 2] provides the method of [Example 1], after creating the communication group associated with the target object, the method further comprising:
- associating the communication group associated with the target object with a first information type of the first information; the communication group being used for receiving a message including information of the first information type of the target object.

According to one or more embodiments of the present disclosure, [Example 3] provides the method of [Example 1], before creating the communication group associated with the target object, the method further comprising:
- determining whether a communication group creating condition of the target object is satisfied;
- in response to determining that the communication group creating condition is satisfied, performing the step of creating a communication group associated with the target object.

According to one or more embodiments of the present disclosure, [Example 4] provides the method of [Example 3], the communication group creating condition of the target object including:
- a communication group associated with the target object is absent; or
- a communication group associated with the target object is absent, and an instruction to create a group is received.

According to one or more embodiments of the present disclosure, [Example 5] provides the method of [Example 4], a communication group associated with the target object is absent, a group creating identification is displayed, and the instruction to create the group is received after the group creating identification is triggered.

According to one or more embodiments of the present disclosure, [Example 6] provides the method of [Example 1], the relevant page of the target object including:
- a page of the target object displayed in an applet; or
- a page of the target object in a data system, the data system including more than one page of the target object.

According to one or more embodiments of the present disclosure, [Example 7] provides the method of [Example 1], the creating a communication group associated with the target object including: sending a group creating instruction to a chatbot, and performing, by the chatbot, the steps of the creating a communication group associated with the target object, and sending, to the communication group, a first notification message obtained based on the first information.

According to one or more embodiments of the present disclosure, [Example 8] provides the method of [Example 4], if a communication group associated with the target object is present, the method further comprising: sending, to the communication group associated with the target object, a first notification message obtained based on the first information.

According to one or more embodiments of the present disclosure, [Example 9] provides the method of [Example 4], if a communication group associated with the target object is present, the method further comprising:
- determining whether a current user that inputs the first information has joined the communication group associated with the target object;
- if not, adding the current user into the communication group associated with the target object.

According to one or more embodiments of the present disclosure, [Example 10] provides the method of [Example 9], adding the current user into the communication group associated with the target object including:
- if the communication group associated with the target object is a communication group created by a chatbot, adding the current user into the communication group associated with the target object;
- or,
- if the communication group associated with the target object is a communication group created by a user and the communication group is set to an open state, adding the current user into the communication group associated with the target object;
- or,
- if the communication group associated with the target object is a communication group created by a user and the communication group is set to a closed state, displaying reminder information, the reminder information being used for prompting at least one of the following information: a failure of adding the current user into the communication group, group owner information, and an entering-group authentication entry.

According to one or more embodiments of the present disclosure, [Example 11] provides the method of [Example 4], if a communication group associated with the target object is present, the method further comprising:
- based on an affiliation relationship of the current user with the communication group and characteristic information of the communication group, displaying one of an entering-group identification or a joining-group identification, the entering-group identification being used for entering the communication group, and the joining-group identification being used for joining the communication group.

According to one or more embodiments of the present disclosure, [Example 12] provides the method of [Example 11], based on an affiliation relationship of the current user with the communication group and characteristic information of the communication group, displaying one of the entering-group identification or the joining-group identification including:
- if the current user has joined the communication group associated with the target object, displaying the entering-group identification, and entering the communication group after the entering-group identification is triggered; or
- if the current user does not join the communication group associated with the target object, and the communication group associated with the target object is a communication group created by a chatbot, displaying the joining-group identification, and joining and entering the communication group after the joining-group identification is triggered; or
- if the current user does not join the communication group associated with the target object, the communication group associated with the target object is a communication group created by a user, and the communication group is set as an open state, displaying the joining-group identification, and joining and entering the communication group after the joining-group identification is triggered; or
- if the current user does not join the communication group associated with the target object, the communication group associated with the target object is a communication group created by a user, and the communication group is set to a closed state, displaying the joining-group identification, and after the joining-group identification is triggered, prompting at least one of the following information: a failure of joining the communication group, group owner information, and an entering-group authentication entry.

According to one or more embodiments of the present disclosure, [Example 13] provides the method of [Example 1], further comprising:

in response to the communication group associated with the target object being created, adding a target user that satisfies a preset rule into the communication group.

According to one or more embodiments of the present disclosure, [Example 14] provides the method of [Example 13], adding the target user that satisfies the preset rule into the communication group including:

determining the target user according to at least one of the target object and a type of the first information;
adding the target user into the communication group.

According to one or more embodiments of the present disclosure, [Example 15] provides the method of [Example 14], determining the target user according to at least one of the target object and a type of the first information including:

determining selectable users associated with the target object;
determining the target user associated with the type of the first information from the selectable users.

According to one or more embodiments of the present disclosure, [Example 16] provides the method of [Example 15], and the type of the first information is used to characterize a use or effect of the first information.

According to one or more embodiments of the present disclosure, [Example 17] provides the method of [Example 1], further comprising:

in response to the communication group associated with the target object being created, sending, to the communication group associated with the target object, a second notification message, the second notification message being used to inform that the target object is associated with the communication group.

According to one or more embodiments of the present disclosure, [Example 18] provides the method of [Example 17], and an address of an information page of the target object in a data system is included in the second notification message;

the second notification message opens the information page of the target object in the data system after being triggered.

According to one or more embodiments of the present disclosure, [Example 19] provides the method of [Example 1], and if a current user that inputs the first information is a member of the communication group associated with the target object, the first notification message is sent via an account of the current user; or a group member of the communication group associated with the target object includes a chatbot, and if the current user is not a member of the target communication group, the first notification message is sent via an account of the chatbot and a user identification of the current user is displayed.

According to one or more embodiments of the present disclosure, [Example 20] provides the method of [Example 1], and the first notification message includes an address of an information page of the target object;

the first notification message, after being triggered, opens the information page of the target object in a data system.

According to one or more embodiments of the present disclosure, [Example 21] provides the method of [Example 1], in response to inputting first information of a target object on a relevant page of the target object, creating a communication group associated with the target object including:

in response to a target area of an associated page for a target object being selected, displaying a group creating option;
in response to the group creating option being selected and the first information being inputted in the target area, creating the communication group associated with the target object.

According to one or more embodiments of the present disclosure, [Example 22] provides the method of [Example 1], and the communication group is a communication group on a communication client;

the relevant page of the target object is other page other than the communication client.

According to one or more embodiments of the present disclosure, [Example 23] provides an apparatus for information processing comprising:

a control unit for in response to inputting first information of a target object on a relevant page of the target object, creating a communication group associated with the target object;
a sending unit for sending, to the communication group, a first notification message obtained based on the first information; wherein the relevant page of the target object is other page other than a group creating page.

According to one or more embodiments of the present disclosure, [Example 24] provides a terminal device comprising:

at least one memory and at least one processor;
wherein the at least one memory is used for storing program code, and the at least one processor is used for calling the program code stored by the at least one memory to execute a method of any of [Example 1] to [Example 22].

According to one or more embodiments of the present disclosure, [Example 25] provides a computer-readable storage medium for storing program code that, when executed by a processor, causes the processor to perform a method of any of [Example 1] to [Example 22].

The foregoing description is only a preferred embodiment of the disclosure and is illustrative of principles of the technology employed. It will be appreciated by those skilled in the art that the scope of the disclosure is not limited to any particular combination of the features described above, but is intended to encompass any combination of the features described above or their equivalents without departing from the spirit of the disclosure. For example, the above-mentioned features and the technical features disclosed in the present disclosure (but not limited to) having similar functions are interchanged to form a technical solution.

Further, while operations are depicted in a particular order, this should not be understood as requiring that the operations be performed in the particular order shown or in sequential order. In certain circumstances, multitasking and parallel processing may be advantageous. As such, while several specific implementation details have been included in the above discussion, these should not be construed as limiting the scope of the present disclosure. Certain features that are described in the context of separate embodiments may also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

We claim:

1. A method for information processing comprising:
in response to inputting first information of a target object on a relevant first page of associated with the target object, creating a communication group associated with the target object;
sending, to the communication group, a first notification message obtained based on the first information;
wherein the first relevant page of the target object is other page other than different from a group creating page;
wherein the creating a communication group associated with the target object includes:
sending a group creating instruction to a chatbot, and performing, by the chatbot, the steps of the creating a communication group associated with the target object, and sending, to the communication group, a first notification message obtained based on the first information.

2. The method of claim 1, wherein after creating the communication group associated with the target object, the method further comprises:
associating the communication group associated with the target object with a first information type of the first information; the communication group being used for receiving a message including information of the first information type of the target object.

3. The method of claim 1, wherein before creating the communication group associated with the target object, the method further comprises:
determining whether a communication group creating condition of the target object is satisfied;
in response to determining that the communication group creating condition is satisfied, performing the step of creating a communication group associated with the target object.

4. The method of claim 3, wherein the communication group creating condition of the target object includes:
a communication group associated with the target object is absent; or
a communication group associated with the target object is absent, and an instruction to create a group is received.

5. The method of claim 4, wherein a communication group associated with the target object is absent, a group creating identification is displayed, and the instruction to create the group is received after the group creating identification is triggered.

6. The method of claim 1, wherein the relevant first page of the target object includes:
a page of the target object displayed in an applet; or
a page of the target object in a data system, the data system including more than one page of the target object.

7. The method of claim 4, wherein
if a communication group associated with the target object is present, the method further comprises: sending, to the communication group associated with the target object, a first notification message obtained based on the first information.

8. The method of claim 4, wherein if a communication group associated with the target object is present, the method further comprises:
determining whether a current user that inputs the first information has joined the communication group associated with the target object;
if not, adding the current user into the communication group associated with the target object.

9. The method of claim 4, wherein if a communication group associated with the target object is present, the method further comprises:
based on an affiliation relationship of the current user with the communication group and characteristic information of the communication group, displaying one of an entering-group identification or a joining-group identification, the entering-group identification being used for entering the communication group, and the joining-group identification being used for joining the communication group.

10. The method of claim 1, further comprising:
in response to the communication group associated with the target object being created, adding a target user that satisfies a preset rule into the communication group.

11. The method of claim 10, wherein adding the target user that satisfies the preset rule into the communication group includes:
determining the target user according to at least one of the target object and a type of the first information;
adding the target user into the communication group.

12. The method of claim 1, further comprising:
in response to the communication group associated with the target object being created, sending, to the communication group associated with the target object, a second notification message, the second notification message being used to inform that the target object is associated with the communication group.

13. The method of claim 12, wherein
an address of an information page of the target object in a data system is included in the second notification message;
the second notification message opens the information page of the target object in the data system after being triggered.

14. The method of claim 1, wherein
if a current user that inputs the first information is a member of the communication group associated with the target object, the first notification message is sent via an account of the current user; or
a group member of the communication group associated with the target object includes a chatbot, and if the current user is not a member of the target communication group, the first notification message is sent via an account of the chatbot and a user identification of the current user is displayed.

15. The method of claim 1, wherein
the first notification message includes an address of an information page of the target object;
the first notification message, after being triggered, opens the information page of the target object in a data system.

16. The method of claim 1, wherein in response to inputting first information of a target object on a relevant first page of associated with the target object, creating a communication group associated with the target object includes:
in response to a target area of an associated page for a target object being selected, displaying a group creating option;

in response to the group creating option being selected and the first information being inputted in the target area, creating the communication group associated with the target object.

17. The method of claim 1, wherein
the communication group is a communication group on a communication client;
the relevant first page of the target object is other a page other than the communication client.

18. An electronic device comprising:
at least one memory and at least one processor;
wherein the at least one memory is used for storing program code, and the at least one processor is used for calling the program code stored by the at least one memory to perform:
in response to inputting first information of a target object on a relevant first page of associated with page of the target object, creating a communication group associated with the target object;
sending, to the communication group, a first notification message obtained based on the first information;
wherein the first relevant page of the target object is other page other than different from a group creating page;
wherein the creating a communication group associated with the target object includes:
sending a group creating instruction to a chatbot, and performing, by the chatbot, the steps of the creating a communication group associated with the target object, and sending, to the communication group, a first notification message obtained based on the first information.

19. A computer-readable storage medium for storing program code that, when executed by a processor, causes the processor to perform:
in response to inputting first information of a target object on a relevant first page of associated with the target object, creating a communication group associated with the target object;
sending, to the communication group, a first notification message obtained based on the first information;
wherein the first relevant page of the target object is other page other than different from a group creating page;
wherein the creating a communication group associated with the target object includes:
sending a group creating instruction to a chatbot, and performing, by the chatbot, the steps of the creating a communication group associated with the target object, and sending, to the communication group, a first notification message obtained based on the first information.

* * * * *